Patented Aug. 8, 1944

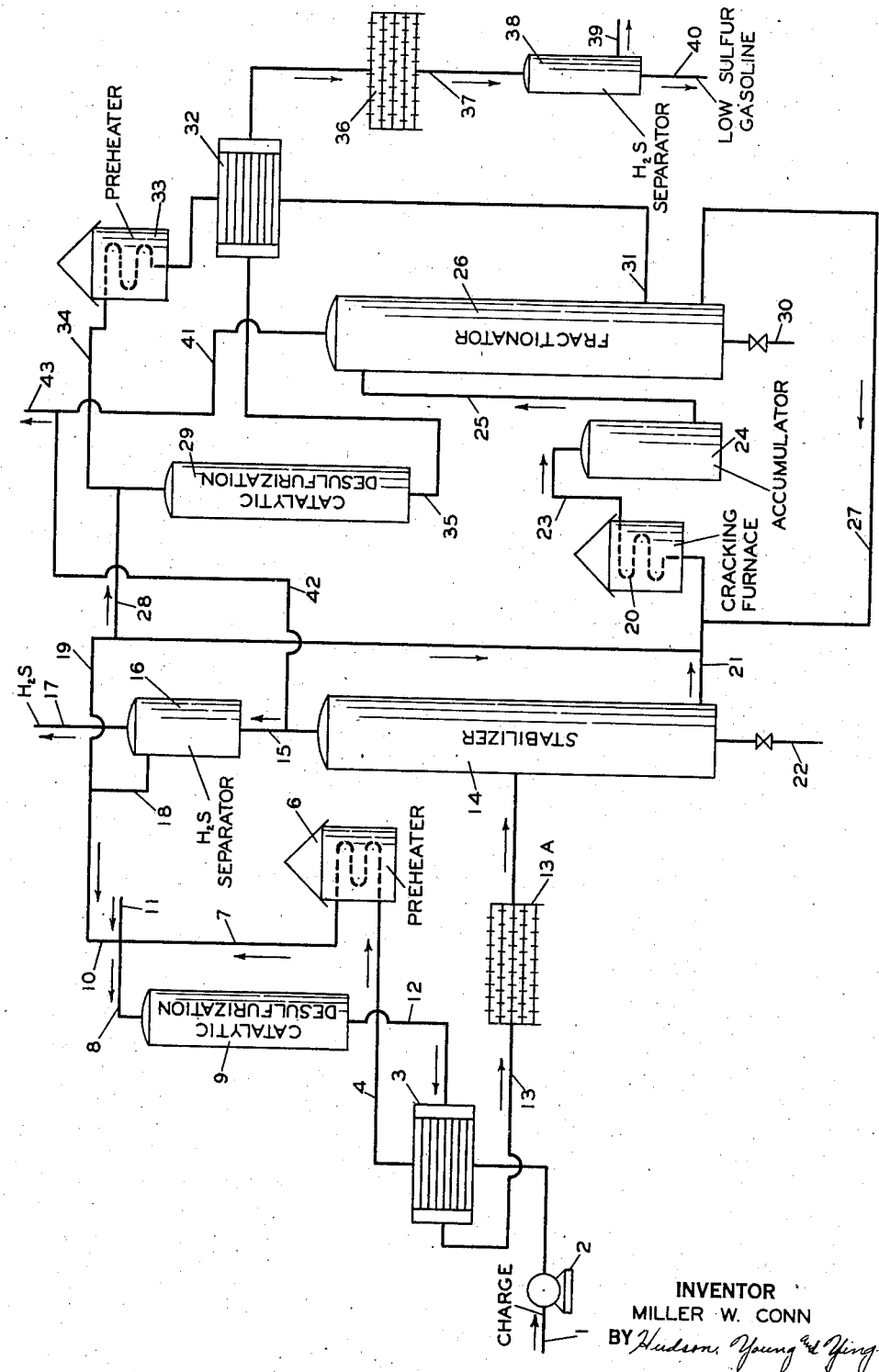

2,355,366

UNITED STATES PATENT OFFICE 2,355,366

PROCESS FOR CATALYTICALLY DESULPHURIZING HYDROCARBON OIL

Miller W. Conn, Bartlesville, Okla., assignor to Phillips Petroleum Company, a corporation of Delaware Application January 12, 1942, Serial No. 426,533

3 Claims. (Cl. 196—24)

This invention relates to processes for treating sulphur bearing hydrocarbon oils to meet the specifications for motor fuel with respect to sulphur content and to obtain an improved tetraethyl lead susceptibility. More specifically it relates to the partial desulphurization of hydrocarbons heavier than gasoline prior to thermal or catalytic conversion to the gasoline range, and the subsequent desulphurization of the products resulting from the thermal or catalytic conversion.

To meet the specifications for motor fuel with respect to total sulphur content, gasolines and distillates and the like from high sulphur petroleum hydrocarbons generally require a drastic treatment for the removal of combined organic sulphur compounds. Generally, it is known that these methods in most common use at present are objectionable in many respects.

To overcome these numerous objections, processes have been devised for sulphur removal which are based on the known catalytic action of certain contact agents on sulphur compounds in the vapor phase at elevated temperatures in which the sulphur is eliminated as hydrogen sulphide. The present invention is an improvement of the processes of this type, particularly with respect to the nature and design of the process employed.

Among the many and numerous catalysts proposed by previous investigators are metals, earths, and oxides or sulphides of metals and the like. The average catalysts mentioned, which are used in catalytic desulphurization processes, are at present generally unsatisfactory for the treatment of sulphur-bearing oils heavier than gasoline and/or hydrocarbon oils, particularly those boiling within the gasoline range resulting from thermal or catalytic cracking and/or reforming processes. Their ability to cause rapid decomposition of organic sulphur compounds with the formation of hydrogen sulphide is rapidly decreased due to the deposition of carbonaceous residues, tars, and the like resulting in poisoning of the catalytic mass. Such a condition requires the frequent regeneration or revivification of the catalytic mass resulting therefore in a rather expensive refining procedure.

The primary object of this invention is to provide a novel process for use in catalytic desulphurization of hydrocarbons containing organic sulphur compounds as impurities, the sulphur being eliminated in the form of hydrogen sulphide which process overcomes the numerous objections inherent in known catalytic desulphurization processes. Another object of this invention is to provide for consecutive catalytic desulphurization treatments of hydrocarbon oils high in organic sulphur in the manufacture of superior quality motor fuels. Numerous other objects will appear from a consideration of the following disclosure taken in conjunction with the accompanying drawing which portrays diagrammatically one form of apparatus suitable for carrying out the present invention.

I have found that in the catalytic desulphurization of hydrocarbon oils, superior results may be obtained by the injection of some extraneous gas, preferably a paraffin or olefin of $C_4$ or lighter such as methane, ethane, ethylene, propane, propylene, or the like in admixture with hydrogen into the super-heated and sulphur-bearing vapors prior to passage over the catalytic desulphurization catalyst mass. It is well known to those skilled in the art that in the ordinary crude oil distillation unit products heavier than gasoline, such as kerosene, distillates, gas-oil, etc., are produced in varying quantities. In many instances it is the practice to convert these products heavier than gasoline to products falling within the gasoline range by means of thermal or catalytic cracking and/or thermal or catalytic reforming processes. During the process of cracking or reforming the sulphur contained in such charged stock is known to become "fixed" in the effluent distillate as cyclic or other forms of sulphur in which it is very difficult to remove from said distillate. By means of the present invention a motor fuel of superior quality with lower sulphur content and improved tetraethyl lead susceptibility can be manufactured from high sulphur-bearing hydrocarbon oils.

In accordance with the present invention in a preferred form, a cracking stock which is adapted upon cracking to yield hydrocarbons in the gasoline range, such as gas oil, kerosene, fuel oil, etc., and which is objectionably high in sulphur is first preheated and vaporized and then passed in admixture with from about 10% to about 50% by volume of a mixture of hydrogen and other fixed gases consisting of $C_4$ and lighter paraffins and olefins, said mixture being derived from a succeeding cracking operation, over a desulphurization catalyst at a temperature of from about 500° F. to about 800° F. This treatment is so conducted that a substantial proportion of the sulphur in the original stock is converted to hydrogen sulphide.

The effluent from this first-stage desulphurization treatment is then cooled to liquefy it and stabilized in any suitable manner known to the art, generally by fractionation, to remove the normally gaseous materials therefrom, namely unchanged hydrogen, hydrogen sulphide and light hydrocarbons (C₄ and lighter). The gaseous overhead is treated in any suitable manner to remove the hydrogen sulphide therefrom and is available for re-use in the process.

The partially desulphurized heavy fraction which consists essentially of the original stock substantially unchanged except for sulphur reduction, is now charged in admixture with a mixture of hydrogen and other fixed gases consisting of C₄ and lighter paraffins and monoolefins, said mixture being derived from the cracking step now to be described, in amount sufficient to represent between about 10% and about 50% by volume of the vaporized mixture, to a cracking furnace of conventional type (either thermal or catalytic) where the stock is cracked in known manner largely to hydrocarbons in the motor fuel range.

By cracking in the presence of the fixed gases containing hydrogen and light hydrocarbons, I effect the decomposition of organic sulphur compounds unaffected by the preceding catalytic desulphurization partly to hydrogen sulphide and partly to a form in which they may be readily removed in a subsequent desulphurization in a catalytic zone. In addition the yield of products in the motor fuel range is substantially increased.

The effluent from the cracking zone is now fractionated to recover a heavy fraction of uncracked or only partially cracked material which is recycled, a fraction boiling in the gasoline or motor fuel range and a light fraction of normally gaseous materials including hydrogen sulphide, and cracking gases namely hydrogen and C₄ or lighter paraffins and olefins. In this way the gasoline fraction is freed from hydrogen sulphide and other normally gaseous sulphur-containing compounds formed in the cracking.

The gaseous fraction thus produced is treated to remove therefrom the sulphur compounds consisting essentially of hydrogen sulphide in any known manner as by alkali washing, and at least partially returned to the system for admixture with the feed to the initial catalytic desulphurization and to the cracking step described above and with the feed to the gasoline desulphurization step now to be described. Any excess may be bled from the system.

The gasoline fraction, free from hydrogen sulphide, is now passed through a preheater and thence in admixture with from about 10% to about 50% by volume of the mixture of hydrogen and light hydrocarbons described above as being produced in the preceding cracking step through a catalytic desulphurization unit at a temperature of from about 500° F. to about 800° F. This treatment still further reduces the sulphur content.

By the use of a mixture of hydrogen and either light paraffins or light olefins (and preferably the latter) in the feed to the three main steps of the process, these materials are enabled to combine with the sulphur and/or hydrogen sulphide liberated and the "fixing" of the liberated or combined sulphur is inhibited. In this way I prevent the reduction of susceptibility to desulphurization which commonly occurs in catalytic desulphurization and in cracking operations.

By using the fixed gases liberated from the second main or cracking step of my process for admixture with the feed to all three main steps, I effect a great simplification in the equipment required, in the operation, and in the cost of producing gasoline of low sulphur content.

My process enables the production of gasoline of lower sulphur content than prior practice or the production of gasoline of a given sulphur content in a more rapid and more economical manner. Numerous other advantages of the invention will be obvious to those skilled in the art. For instance my process enables the treatment to be carried out without necessity for introduction of materials from outside. Thus in my process all the necessary materials are derived from the original raw material. In other words my process is wholly self-contained and unitary. In my process the peculiar combination and arrangement of the several steps in such manner as to interlock as disclosed operates to produce maximum desulphurization in the simplest and most economical manner.

If desired I may introduce gasoline itself as the feed stock instead of a conventional cracking stock. In such case the cracking step described above will preferably be primarily a reforming type of cracking. For example sulphur-containing straight-run gasoline or naphtha, or natural gasoline may be employed as feed. Such a reforming operation increases markedly the octane number of the gasoline. Frequently in the cracking of cracking stock reforming of the products may also take place. In fact the precise nature of what takes place in the cracking or reforming operation is not known, but may involve dehydrogenation, isomerization, hydrogenation, rearrangement, carbon chain splitting, and numerous other chemical reactions.

The method of conducting the thermal or catalytic cracking or reforming step of my invention is well known to those skilled in the art and need not be described in detail, my cracking or reforming step differing from the conventional cracking and reforming operations chiefly in that it is conducted in the presence of a substantial amount of fixed gases including hydrogen and paraffins and/or olefins, preferably the latter, and that I effect a substantial reduction in sulphur content in said step. The selection of temperature, pressure, time, apparatus, catalyst, and other details for the step are well within the skill of the art. This step is usually conducted at temperatures above 700° F. and generally above 900° F. ranging up to as high as 1200° F. Usually it is carried out under high pressure, say at least 200 lbs. per sq. in. The step may be conducted in either liquid phase, liquid-vapor phase or vapor phase fashion; preferably the latter.

As desulphurization catalysts for the desulphurization in the first and third main steps, I may use any of the well-known solid catalysts for this step, such as bauxite, chromium ore, vanadium ore, tungsten ore, molybdenum ore, cadmium ore, zinc ore, zirconium oxide, etc., as disclosed in U. S. Patents 2,016,271; 2,016,272; 2,015,271-4; 2,098,943; 2,112,931; 2,151,723; 2,206,921; etc.

By reference to the accompanying drawing it is to be noted that hydrocarbon products to be desulphurized, such as kerosene, distillate, gas-oil, etc., and in some instances gasolines, are charged via lines 1 and 4 to preheating furnace 6 by means of pump 2 by way of exchanger 3. In passage through furnace 6 the feed stock is heated to a suitably elevated temperature, say to from about 500° F. to about 800° F., whereby it is vaporized and heated to such an extent as to enable the catalytic desulphurization step to proceed most effectively. If desired the temperature to which the stock is brought in 6 may slightly exceed the temperature at which the subsequent catalytic desulphurization step is conducted in order to compensate for any cooling effect of the addition of extraneous gases to the desulphurization feed stream and any loss of heat in the lines conducting the vapors to the desulphurization tower 9 itself. Desirably the feed lines and tower 9 are lagged to reduce loss of heat by radiation. As will be obvious, any or all of the lines and equipment portrayed in the drawing may thus be lagged in appropriate manner. From the furnace 6 the super-heated high sulphur stock is charged to catalyst tower 9 through lines 7 and 8 in admixture with certain gases such as hydrogen, methane, ethane, ethylene, propane, propylene, butane, butylene, and the like produced as a result of the cracking operation, subsequently to be described, and injected through line 10 or added from an extraneous source through line 11. Thus a more effective desulphurization of the charged stock at temperatures within the range of 500° F. to 800° F. is obtained to an extent hitherto not obtained in catalytic desulphurization processes. The presence of the lighter than gasoline hydrocarbon vapors, and particularly the presence of the hydrogen in admixture with the superheated vapors in passing over the catalytic mass, result in greatly improved catalyst life cycles.

From the catalyst tower 9 the effluent will pass via line 12 into heat exchange with the cold charge in exchanger 3, thence via line 13 containing cooler 13A to a stabilizer tower 14. In lieu of stabilizer tower 14 any other suitable hydrogen sulphide removal means such as caustic washing, etc., well known to the art, may be employed. Stabilizer 14 overhead containing considerable quantities of hydrogen sulphide and other fixed gases passes by line 15 to separation zone 16 of any suitable type in which hydrogen sulphide in final traces is removed by line 17, after which the remaining gases such as butane, butylenes, and lighter, and appreciable quantities of hydrogen are removed by way of line 18 and enter line 10 previously described. Part of the gaseous products in line 10 is preferably diverted to the cracking and/or reforming coil 20 by line 19 for admixture with the desulphurized cracking stock from stabilizer 14 in line 21 which removes heavy material from a point near the bottom of tower 14. Extremely heavy material such as tar and other bottom products unsuitable for further processing may be removed from tower 14 via line 22. If desired some recycle cracking stock from fractionator 26 may enter line 21 via line 27. Furthermore, some of the hydrogen sulphide-free gaseous products leaving separator 16 by way of line 18 may be diverted via line 28 through tower 29 as a means of improving catalytic desulphurization and prolonging catalyst life cycle as will hereinafter be described.

The cracking or reforming operation may be either the conventional thermal or catalytic process in which the charged stock as in this case is admixed with considerable quantities of "fixed" gases such as have been heretofore mentioned, and particularly hydrogen and light olefinic materials. I have found that the presence of hydrogen in the cracking coil charge materially aids in the decomposition of combined or "fixed" sulphur compounds remaining after the previous catalytic desulphurization step. Also I have found that the presence of olefinic materials in the cracking coil charge materially improves the yield of products boiling within the gasoline range and also greatly improves the quality of such products boiling within the gasoline range and particularly the anti-knock characteristics. The cracked products as may be accumulated in drum 24 are discharged to fractionator 26 from which numerous products may be obtained as is well known to one skilled in the art. One product may be a cracking recycle stock discharged by line 27 to line 21 and thereby returned to furnace 20. Heavy bottoms may be removed by line 30. The products falling within the gasoline range may be discharged by line 31 to heater 33 by exchanger 32 from which heater they may be discharged in the super-heated state via line 34 to catalyst tower 29 containing a catalytic mass designed to further reduce the sulphur content of the gasoline produced as described. As previously indicated the super-heated gasoline vapors passing through tower 29 are preferably admixed with considerable quantities of "fixed" gases, and particularly hydrogen gas and a light olefin or paraffin, supplied via line 28, to aid in obtaining a more effective catalytic desulphurization and to prolong the catalyst life cycle, thereby resulting in a more economical operation. From catalyst tower 29 the vapors pass via line 35 in exchange with the charge in exchanger 32 and cooler 36 and then via line 37 to hydrogen sulphide removal and/or stabilization zone 38 of any conventional means or type, from which a low sulphur gasoline is obtained via line 40, H₂S passing off via line 39. The hydrogen sulphide removal or stabilization zone is preferably an after fractionator designed to eliminate hydrogen sulphide as an overhead cut and remove any polymeric compounds that may result from the action in chamber 29.

The overhead or gaseous fraction from fractionator 26 is passed via lines 41 and 42 to zone 16 wherein it is freed of hydrogen sulphide by return to the system as has been described. Any excess accumulation of gaseous products may be eliminated through line 43 if desired.

The advantages of the present invention are obvious to one skilled in the art and may be enumerated as follows:

1. By means of the present invention a low sulphur cracking stock may be obtained.

2. Products suitable for cracking stock but containing high percentages of organic sulphur compounds may be more effectively desulphurized with longer catalyst life cycles.

3. By means of the present invention the cracking operation herein described will result in a product of superior anti-knock qualities due to the more effective elimination of sulphur compounds in the cracking operation.

4. Following the cracking operation and the removal of hydrogen sulphide from the gasoline stream produced therefrom, further improvement in motor fuel quality and tetraethyl lead susceptibility may be obtained through a subsequent catalytic desulphurization step as described.

5. The product produced as a result of the present invention will be superior not only from the standpoint of anti-knock qualities but also will exhibit superior stability due to the more effective lowering of the organic sulphur contents by means of the processes herein described.

As illustrating the greater sulphur reduction using my process than is possible with prior processes the following may be considered. Straight desulphurization of cracked gasoline in the ordinary manner shows roughly on an average of 40% sulphur reduction. Experiments conducted by me on desulphurization of "crude overhead" (gas oil blend) over bauxite show a sulphur reduction on the average of about 25% which is of course insufficient to make such a process economical in view of the short catalyst cycle possible. In my process, by using the extraneous gases added to the feeds to the desulphurization steps and to the cracking or reforming step, I am enabled to effect a total overall reduction in sulphur of at least about 90%. At the same time catalyst life in my process is enhanced to such an extent that the process becomes economically feasible.

If desired, I may omit the final catalytic desulphurization of the gasoline fraction in tower 29, otherwise using exactly the process described. In such case the gasoline fraction issuing from line 31 is the final product though of course it may, if desired be treated to remove any final traces of hydrogen sulphide or the like. Thus in a broader or in a subcombination aspect, my invention comprises first catalytically desulphurizing a cracking or reforming stock in the presence of the fixed cracking gases described above, separating hydrogen sulphide and the like from the effluent, and subjecting the effluent in the presence of fixed cracking gases to the cracking or reforming step with final recovery from the cracking effluent of a gasoline fraction free from hydrogen sulphide and the like.

I have discovered that the procedure just described of catalytically desulphurizing a stock and then cracking it results in a much higher overall sulphur reduction than a converse procedure in which the stock is first cracked and the gasoline fraction of the effluent, free from H₂S, subjected to catalytic desulphurization.

While I have described my invention specifically for purposes of illustration, it is to be understood that numerous changes and modifications may be made therein without departing from the spirit thereof and that the invention is to be taken as limited only by the terms of the appended claims.

As used in the claims the term "cracking" is used to include reforming, as is conventional in the art. See Nelson "Petroleum Refinery Engineering," page 470, and Ellis, "Chemistry of Petroleum Der." vol. II, page 105.

I claim:

1. The process which comprises catalytically desulphurizing hydrocarbon oils of the gasoline range and heavier by passage of said oils in the vapor phase over a desulphurization catalyst at a temperature from approximately 500° to 800° F. in the presence of from about 10 to 50% by volume of hydrogen sulphide free gases consisting essentially of hydrogen and C₄ and lighter hydrocarbons, said gases being derived from a subsequent step, removing hydrogen sulphide, hydrogen, and C₄ and lighter hydrocarbons from the desulphurization effluent, subjecting the resulting material in the vapor phase to a cracking step at a temperature of approximately 900° to 1200° F. in the presence of an additional portion of said hydrogen sulphide free gases in amount equal to from about 10 to 50% by volume, fractionating the cracking effluent into a gaseous fraction comprising hydrogen sulphide, hydrogen and C₄ and lighter hydrocarbons, a heavy bottoms product and a gasoline boiling range product, and removing the latter; combining the gases comprising hydrogen sulphide, hydrogen and C₄ and lighter hydrocarbons from the desulphurizing step and from the cracking step, removing the hydrogen sulphide and other sulphur containing compounds and recycling the hydrogen sulphide free gases to the desulphurization and cracking steps as above stated.

2. The process which comprises catalytically desulphurizing hydrocarbon oils of the gasoline range and heavier by passage of said oils in the vapor phase over a solid desulphurization catalyst at a temperature from approximately 500° to 800° F. in the presence of from about 10 to 50% by volume of hydrogen sulphide free gases consisting essentially of hydrogen and C₄ and lighter hydrocarbons, said gases being derived from a subsequent step, removing hydrogen sulphide, hydrogen, and C₄ and lighter hydrocarbons from the desulphurization effluent, subjecting the resulting material in the vapor phase to a catalytic cracking step at a temperature of approximately 900° to 1200° F. in the presence of an additional portion of said hydrogen sulphide free gases in amount equal to from about 10 to 50% by volume, fractionating the cracking effluent into a gaseous fraction comprising hydrogen sulphide, hydrogen and C₄ and lighter hydrocarbons, a heavy bottoms product and a gasoline boiling range product, and removing the latter; combining the gases comprising hydrogen sulphide, hydrogen and C₄ and lighter hydrocarbons from the desulphurizing step and from the cracking step, removing the hydrogen sulphide and other sulphur containing compounds and recycling the hydrogen sulphide free gases to the desulphurization and cracking steps as above stated.

3. The process which comprises catalytically desulphurizing hydrocarbon oils of the gasoline range and heavier by passage of said oils in the vapor phase over a desulphurization catalyst at a temperature from approximately 500° to 800° F. in the presence of a substantial amount of hydrogen sulphide free gases consisting essentially of hydrogen and C₄ and lighter hydrocarbons, said gases being derived from a subsequent step, removing hydrogen sulphide from the desulphurization effluent and subjecting the resulting effluent material to a vapor phase cracking operation at approximately 900° to 1200° F. in the presence of a substantial amount of hydrogen sulphide free gases consisting essentially of hydrogen and C₄ and lighter hydrocarbons, separating from the cracked effluent a gasoline fraction free of hydrogen sulphide as a product of the process, a gaseous fraction comprising hydrogen sulphide, hydrogen and C₄ and lighter hydrocarbons, separating the hydrogen sulphide from the said gaseous fraction and recycling this hydrogen sulphide free gaseous fraction consisting essentially of hydrogen and C₄ and lighter hydrocarbons in said substantial amounts to the above said desulfurization step and the cracking step.

MILLER W. CONN.